United States Patent [19]

Cooke

[11] Patent Number: 4,460,791

[45] Date of Patent: * Jul. 17, 1984

[54] OIL RECOVERY BY FLUOROCHEMICAL SURFACTANT WATERFLOODING

[75] Inventor: Thomas W. Cooke, Mahopac, N.Y.

[73] Assignee: Ciba-Geigy Corporation, Ardsley, N.Y.

[*] Notice: The portion of the term of this patent subsequent to Jan. 12, 1999 has been disclaimed.

[21] Appl. No.: 380,372

[22] Filed: May 20, 1982

Related U.S. Application Data

[60] Division of Ser. No. 219,663, Dec. 24, 1980, abandoned, which is a continuation of Ser. No. 944,820, Sep. 22, 1978, abandoned.

[51] Int. Cl.$^3$ .................... C07C 149/18; C11D 1/722
[52] U.S. Cl. ................. 568/45; 252/174.22; 252/352; 568/46
[58] Field of Search .................... 568/45, 46

[56] References Cited

U.S. PATENT DOCUMENTS

| | | | |
|---|---|---|---|
| Re. 29,243 | 5/1977 | Umbach et al. | 568/46 |
| 3,081,354 | 3/1963 | Gaertner et al. | 568/46 |
| 3,700,646 | 10/1972 | Anello et al. | 568/45 |
| 3,758,595 | 9/1973 | Lamberti et al. | 568/46 |
| 3,821,372 | 6/1974 | Vanlerberghe et al. | 568/46 |
| 3,906,049 | 9/1975 | Hager et al. | 568/50 |
| 3,935,277 | 1/1976 | Dear et al. | 568/46 |
| 4,266,080 | 5/1981 | Falk et al. | 568/45 |
| 4,310,698 | 1/1982 | Cooke | 568/45 |

FOREIGN PATENT DOCUMENTS

1354138 5/1974 United Kingdom ............... 568/615

OTHER PUBLICATIONS

J. Moilliet et al., Surface Activity, pp. 442–443 (1961), Van Nostrand, Inc., N.J.

*Primary Examiner*—Donald G. Daus
*Assistant Examiner*—M. C. Eakin
*Attorney, Agent, or Firm*—Michael W. Glynn

[57] ABSTRACT

The instant invention relates to the recovery of oil from subterranean oil reservoirs involving the injection of an aqueous based liquid containing a fluorochemical surfactant possessing an oleophobic-hydrophobic fluoroaliphatic group, a hydrophilic group and an oleophilic group, optionally in conjugation with a conventional enhanced oil recovery surfactant.

2 Claims, No Drawings

OIL RECOVERY BY FLUOROCHEMICAL SURFACTANT WATERFLOODING

This is a Division of application Ser. No. 219,663 filed on Dec. 24, 1980, now abandoned which is a continuation of application Ser. No. 944,820, filed on Sept. 22, 1978, now abandoned.

BACKGROUND OF THE INVENTION

This invention relates to the recovery of oil from subterranean oil reservoirs and the like by employing, in an aqueous based liquid, a fluorochemical surfactant of the formula $$R_f\text{—}Z_m\text{—}A\text{—}Q_n\text{—}R_{HC}$$

wherein
- $R_f$ is a fluoroaliphatic group,
- $Z$ is a linking group,
- $A$ is a divalent hydrophilic radical,
- $Q$ is a linking group,
- $R_{HC}$ is an oleophilic, aliphatic or araliphatic tail, and
- $m$ and $n$ are independently 0 or 1.

In the recovery of oil from oil-bearing reservoirs, it is ordinarily possible to recover only minor portion of the original oil in place by the so-called primary recovery methods which utilize only the natural forces present in the reservoir. In order to increase oil recovery over that economically recovered using such natural forces, a variety of enhanced recovery techniques have been developed. One of the most widely used enhanced recovery techniques involves the use of water-flooding. The water is ordinarily injected into the reservoir to push the crude oil toward producing wells. The amount of oil recovered by water flooding depends upon such factors as interfacial tension between the water and the crude oil, the relative mobilities of the crude oil and the water, and the wettability characteristics of the rocks holding the oil in the reservoir.

In order to increase the effectiveness of the water-flooding techniques, surfactants have been added to the water. The surfactant lowers the surface tension of the aqueous liquid and the interfacial tension between the aqueous liquid and the petroleum and increases the water-wetting properties thereof thereby reducing the capillary forces in the subterranean formation being treated. This aids in dislodging the oil from the subterranean sand and rock formations. Most commonly, aqueous compositions containing petroleum sulfonates have been used advantageously in combination with controlled amounts of NaCl. Also, sodium carbonate and/or sodium tripolyphosphate may be added to such composition as an adjuvant in protecting the petroleum sulfonate surfactant from loss due to precipitation reactions with divalent cations. Moreover, the use of thickening agents has been proposed in order to increase the sweep efficiency of the water flood. One water flood technique involves the use of a preflush or conditioning slug, to minimize the amount of divalent cations (e.g., $Ca^{2+}$, $Mg^{2+}$) which would precipitate or absorb the surfactant, a surfactant containing slug to loosen and dislodge the oil from the sand and rock, and a mobility buffer slug, which can be used to push against the surfactant system.

The preflush or conditioning slug is free from cations which would impair the surfactant and may contain, in part or whole, solutions of sodium carbonate and sodium tripolyphosphate and the like. Optionally NaCl brine may be then injected to optimize the salt concentration for optimum surfactant performance. The sodium ions also displace the calcium and magnesium ions. Strong acid may be used to break up carbonate rock formation. After injection with the aqueous surfactant solution, the mobility buffer slug is injected. The mobility buffer usually contains a water soluble polymer such as polyacrylamide or a bio-polymer (e.g., natural gums).

Subsequent to the injection of the mobility buffer or control slug, a driving fluid is injected in order to displace the previously injected fluids through the sand or rock formation. The nature of the driving fluid is not critical and may, for example, be locally available water. The driving fluid should not, however, be incompatible with the subterranean formation. In one embodiment of the aforementioned technique using a preflush slug, surfactant slug and mobility buffer slug, the surfactant slug is in the form of an aqueous microemulsion of oil, in combination with petroleum sulfonates, co-surfactants, such as alcohols and electrolytes.

SUMMARY OF THE INVENTION

In accordance with the present invention, there is provided a method of treating subterranean formations to stimulate the flow of oil therefrom, and surfactant compositions for use in such treatments.

More particularly, the present invention includes the use of aqueous surfactant compostions for the enhanced recovery of oil from subterranean reservoirs, wherein the surfactant is a fluorochemical surfactant of the formula $$R_f\text{—}Z_m\text{—}A\text{—}Q_n\text{—}R_{HC}$$

wherein
- $R_f$ is a hydrophobic-oleophobic fluoroaliphatic group, containing at least four carbon atoms,
- $Z$ is a divalent linking group,
- $A$ is a divalent hydrophilic organic radical,
- $Q$ is a divalent linking group,
- $R_{HC}$ is an hydrophobic-oleophilic aliphatic radical containing at least 6 carbon atoms, or an araliphatic radical of at least 9 carbon atoms, and
- $m$ and $n$ are independently 0 or 1.

DETAILED DESCRIPTION OF THE INVENTION

Eligible fluorochemical surfactants are those which correspond to the above formula and provide a solubility in water at 30° C. of at least 0.01% by weight, exhibit a surface tension of less than 30 dynes/cm at 0.1% by weight actives in deionized water, and exhibit an interfacial tension of less than 12 dynes/cm at 0.1% by weight actives in deionized water, measured against cyclohexane.

As the artisan can appreciate, the solubility of the eligible surfactants in deionized water may be less than that concentration used (0.1% by weight in deionized water) in measuring surface and interfacial tensions. In such cases, the measurements are done in a saturated heterogenous aqueous system containing 0.1% of the fluoroaliphatic surfactant in deionized water.

Preferably, the fluoroaliphatic surfactant exhibits a surface tension at 0.1% actives in deionized water of about 16–28 dynes/cm and an interfacial tension in the range of about 4–10 dynes/cm in deionized water, measured against cyclohexane.

The fluoroaliphatic surfactants ordinarily contain at least 2 to 50% fluorine by weight, and preferably 5 to 35% fluorine by weight.

The $R_f$ radical is advantageously a straight or branched chain perfluoroaliphatic radical which contains at least 4 carbon atoms and may be interrupted by oxygen. For economic reasons, the $R_f$ group ordinarily contains less than 25 carbon atoms.

In a preferred embodiment, the $R_f$ group is straight or branched chain perfluoroalkyl of 4–20 carbon atoms, straight or branched chain perfluoroalkenyl of 4–20 carbon atoms, or straight or branched chain perfluoroalkyl-polyperfluoroalkoxyperfluoroalkylene of up to 24 carbon atoms.

Suitable $R_f$ groups include those having the following formulae:

$$C_nF_{2n+1} \quad (I)$$
where n is 4 to 20;

$$C_nF_{2n-1} \quad (II)$$
where n is 4 to 20;

and $$C_mF_{2m+1}O(C_pF_{2p}-O)_qC_rF_{2r} \quad (III)$$

where
m is 1 to 3
p is 2 to 4
q is 0 to 6, and
r is 1 to 10, with the proviso that m+p+q+r is at least 4.

Suitable $R_f$ groups of formula (I) include $CF_3(CF_2)_x$ where x is 3 to 19 and mixtures thereof, as well as those of the type $$\begin{array}{c}CF_3\\ \phantom{xx}\diagdown\\ \phantom{xxxx}CF{-}(CF_2CF_2)_{1-9}{-}\\ \phantom{xx}\diagup\\ CF_3\end{array}$$

and mixtures thereof.

Suitable $R_f$ groups of formula (II) include those of the type $CF_3(CF_2)_{0-8}-CF=CF(CF_2)_{0-8}$ and mixtures thereof, as well as branched chain analogs such as $$CF_3-\underset{\underset{C_2F_5}{|}}{\overset{\overset{C_2F_5}{|}}{C}}-\underset{}{\overset{\overset{CF_3}{|}}{C}}=\overset{\overset{CF_3}{|}}{C}-$$

Exemplary $R_f$ groups of formula (III) include those of the type $$\begin{array}{c}CF_3\\ \phantom{xx}\diagdown\\ \phantom{xxxx}CF{-}O{-}(CF_2)_{2-6},\\ \phantom{xx}\diagup\\ CF_3\end{array}$$

$CF_3-O-(CF_2CF_2O)_{1-5}(CF_2)_{2-4}$, $CF_3-O-(CF_2CF_2O)_{1-5}(CF_2)_{2-4}$ and $$\begin{array}{c}CF_3\\ \phantom{xx}\diagdown\\ \phantom{xxxx}CF(O-CF_2-CF)_{1-10}-\\ \phantom{xx}\diagup\phantom{xxxxxxxxxx}|\\ CF_3\phantom{xxxxxxxxxx}CF_3\end{array}$$

and mixtures thereof.

The $R_f$ radical may also contain substituents other than fluorine, such as chloro and hydrogen. However, ordinarily not more than 20% of such substituents should be other than fluorine in order for the radical to maintain its hydrophobic-oleophobic character.

Suitable $R_f$ radicals containing such other substituents include the following $H(CF_2)_{5-20}-$; and $$CF_3{+}(CF_2)_a\underset{\underset{Cl}{|}}{CF}-\underset{\underset{Cl}{|}}{CF}(CF_2)_b$$

where
a is 0–8, and
b is 0–8, with the proviso that a+b is between 2 and 16.

The nature of the divalent linking group Z, when present, is not critical as long as it performs the essential function of covalently bonding the fluoroaliphatic group, $R_f$, to the hydrophilic organic radical A.

Thus, Z may, for example, be selected from the following
-$C_1$-$C_6$ alkylene-,
-phenylene-,
-($C_1$-$C_6$-alkylene)-$R_1$-($C_1$-$C_6$-alkylene)-,
-($C_1$-$C_6$-alkylene)-$R_1'$),
-$R_1$-($C_1$-$C_6$-alkylene)-,
-$R_1$-($C_1$-$C_6$-alkylene-$R_1'$)-,
-$R_1$-,
-$R_1$-phenylene-($C_1$-$C_6$-alkylene-$R_1'$)-,
-$R_1$-phenylene-, or
-phenylene-$R_1$-, wherein, in each case, said alkylene and phenylene are independently unsubstituted or substituted by hydroxy, halo, nitro, carboxy, $C_1$-$C_6$-alkoxy, $C_1$-$C_6$-alkanoyl, $C_1$-$C_6$-carbalkoxy, $C_1$-$C_6$-alkanoyloxy or $C_1$-$C_6$-alkanoylamino. The alkylene radical may be straight or branched chain.

$R_1$ and $R_1'$ independently represent $-\underset{\underset{R_2}{|}}{N}-$, $-CO-$, $-NR_2CO-$, $-CONR_2-$, $-NR_2\overset{\overset{O}{\|}}{C}O-$, $-OCONR_2-$, $-S-$, $-SO-$, $-SO_2-$, $-NR_2SO_2-$, $SO_2NR_2-$, $-NR_2CONR_2-$, $-NR_2-SO_2-NR_2-$, $-\overset{\overset{O}{\|}}{C}O-$, $-O\overset{\overset{O}{\|}}{C}-$, $-SO_2O-$, $-OSO_2-$, $-OSO_2O-$, $-O\overset{\overset{O}{\|}}{C}O-$, $-O\underset{\underset{OR_2}{|}}{\overset{\overset{O}{\|}}{P}}-O-$, $-\underset{\underset{O}{|}}{\overset{\overset{O}{\|}}{P}}-$, $-\underset{\underset{O}{|}}{\overset{\overset{O}{\|}}{P}}-O-$, $-O-\underset{\underset{O}{|}}{\overset{\overset{O}{\|}}{P}}-$ or $-O-$.

$R_2$ is hydrogen, $C_1$-$C_6$-alkyl or $C_1$-$C_6$-alkyl substituted by: $C_1$-$C_6$-alkoxy, halo, hydroxy, carboxy, $C_1$–$C_6$-carbalkoxy, $C_1$–$C_6$-alkanoyloxy or $C_1$–$C_6$-alkanoylamino.

In addition, Z may contain a cycloaliphatic or heterocyclic radical.

Thus, for example, $R_1$ may additionally represent

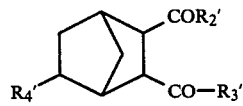

where
$R_2'$ is —$OR_2$, —OM where M is hereinafter defined, or —$NHR_2$;
$R_3'$ is —O— or —N—; and
$R_4'$ is hydrogen, halo, $C_1$–$C_6$-alkyl or $C_1$–$C_6$-alkoxy; or $R_1$ is

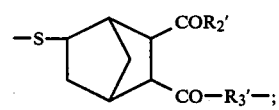

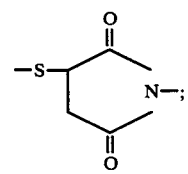

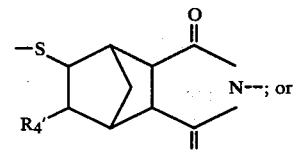

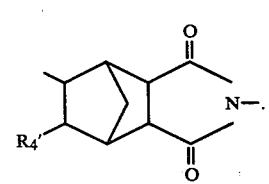

Suitable hydrophilic radicals A are for example, those hydrophilic divalent radical of the following formulae:

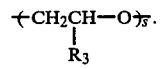

wherein $R_3$ is hydrogen; or a mixture of hydrogen and methyl, with the proviso that such $R_3$ are predominantly hydrogen;

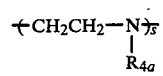

where $R_{4a}$ is hydrogen, lower alkyl or hydroxyethyl;

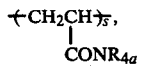

wherein $R_{4a}'$ is hydrogen or hydroxyethyl;

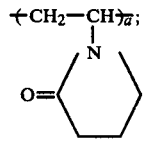

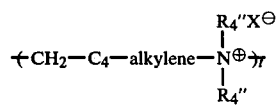

where t is 1–3 and $R_4''$ is lower alkyl, hydroxy-lower alkyl or $(CH_2CH_2O)_sH$;

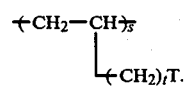

where t is 1–3 and T is —$SO_3M$, —COOM, —$PO_3M$, —$OSO_3M$ or —$OPO_3M_2$, and M is hydrogen, ammonium or an alkali metal cation; or

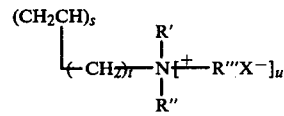

wherein R′, R″ and R‴ are independently hydrogen; $C_1$–$C_4$-alkyl or $C_2$–$C_4$-alkyl substituted by hydroxy, $C_1$–$C_4$-alkoxy or hydroxy-$C_2$–$C_4$-alkoxy; and one of R′ and R″ may additionally represent benzyl; u is 0 or 1;
R‴ is additionally $C_1$–$C_6$-alkylene substituted by sulfo or carboxy; X is an acetate, halo, methosulfate or hydroxyl anion where u is 1 and R‴ is other than said $C_1$–$C_6$-alkylene; and t is 1–3.

In each of the above formulae where mentioned, s is 2–60, preferably 5–25.

As the artisan can appreciate, mixtures of the aforementioned hyrophilic radicals may be present.

Also contemplated are hydrophilic divalent radicals wherein at least a portion of the hydrophilic character is due to a pendant group such as divalent radical of the formulae:

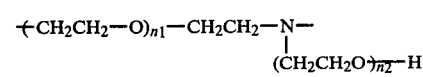

where $n_1$ is 0–20 and $n_2$ is 1–20;

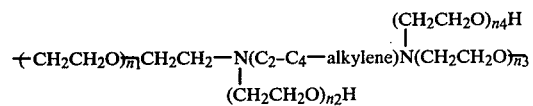

where $n_1$ and $n_3$ are independently 0–20 and $n_2$ and $n_4$ are independently 1–20;

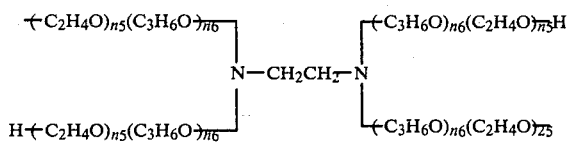

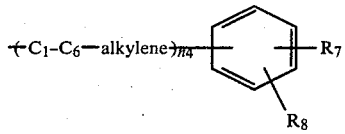

wherein $n_5$ is independently 2-20 and $n_6$ is independently 1-10; or

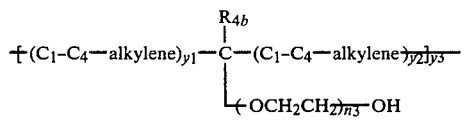

where
$R_{4b}$ is hydrogen, $C_1$-$C_4$ alkyl, or $(OCH_2CH_2)_{n4}OH$;
$y_1$ and $y_2$ are independently 0-4;
$y_3$ is 1-8; and
$n_2$ and $n_4$ are independently 1-20.

Q is a divalent linking group, and, like Z, is not critical as long as it performs the essential function of covalently bonding the hydrophilic organic radical A to the hydrophobic-oleophilic group $R_{HC}$.

Thus, the linking group Q is independently selected from those groups recited supra for Z, with the proviso that when $R_1$ or $R'_1$ are directly bonded to A, and A terminates in an oxy or amino ligand; $R_1$ and $R'_1$ in this position is other than

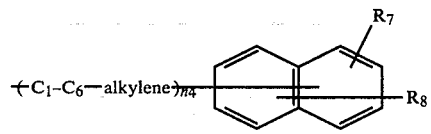

$R_{HC}$ is a hydrophobic-oleophilic, aliphatic or araliphatic monovalent group.

Suitable $R_{HC}$ groups include hydrophobic-oleophilic higher alkyl or alkenyl of 6-24 carbon atoms, which are unsubstituted or substituted by: chloro, bromo, alkoxy of up to 18 carbon atoms, nitro, alkanoyl of up to 18 carbon atoms, alkylmercapto of up to 18 carbon atoms, amino, $C_1$-$C_{18}$-alkylamino or di-$C_1$-$C_{18}$-alkylamino.

Preferably, $R_{HC}$ is said alkyl or alkenyl of at least 8 carbon atoms. The alkyl and alkenyl groups may be straight or branched chain. Mixtures thereof may be used.

In addition, the $R_{HC}$ group may be a group of the formula

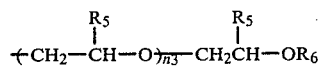

wherein $R_5$ is $C_1$-$C_6$-alkyl, $n_3$ is 5-20, and $R_6$ is hydrogen or alkyl of up to 24 carbon atoms.

Moreover, the $R_{HC}$ group may be a hydrophobic-oleophilic araliphatic radical of at least 9 carbon atoms.

Suitable such groups include those of the formula:

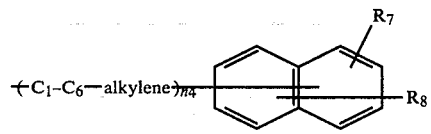

where
$n_4$ is 0-1;
$R_7$ is alkyl of up to 20 carbon atoms, alkoxy of up to 20 carbon atoms, alkanoyl of up to 20 carbon atoms, mono- or di-alkylamino of up to 20 carbon atoms, alkylmercapto of up to 20 carbon atoms, alkanoyloxy of up to 20 carbon atoms, or carbalkoxy of up to 20 carbon atoms;
$R_8$ is hydrogen, halo, nitro or $R_7$.

Also contemplated are hydrophobic-oleophilic groups of the formula

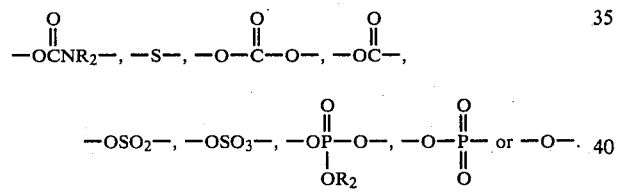

where $n_4$, $R_7$ and $R_8$ are defined as above.

In addition, the group $-Q_n-R_{HC}$ where n is 1 may represent a group of the formula

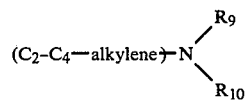

wherein $R_9$ and $R_{10}$ are independently higher alkyl groups of 6-24 carbon atoms, or the group

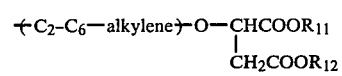

wherein $R_{11}$ and $R_{12}$ are higher alkyl of 6-24 carbon atoms.

Preferred compounds are those which are substantially nonionic; i.e., free from strongly acidic groups, such as $-SO_3H$ and $-PO_3H$ and free from strongly basic quaternary ammonium groups.

Amongst such preferred substantially nonionic surfactants especially highlighted are those which both exhibit a surface tension at 0.1% actives in deionized water of about 16-28 dynes/cm, provide a solubility in water of at least 0.01% by weight, exhibit an interfacial tension of less than 12 dynes/cm at 0.1% by weight actives in deionized water measured against cyclohexane and wherein the corresponding hydrocarbon surfactant $R_{HC}-Q_n-A-OH$, has an apparent HLB (hydrophilic-lipophilic balance) in the range of about 5-24, and preferably in the range of about 12-18.

The HLB of a substantially nonionic hydrocarbon surfactant is a well known indication of the percentage weight of the hydrophilic portion of the nonionic hydrocarbon surfactant molecule. See, for example Ind. and Eng. Chem., Anal. Ed. Vol. 18, page 500 (1946).

An especially preferred class of fluorochemical surfactants are those of the type $R_f-Z_m(CH_2CH_2-O)_sQ_n-R_{HC}$ wherein $R_f$ is as defined above;

$R_{HC}$ is alkyl of 6–24 carbon atoms or

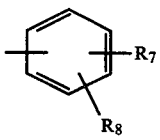

where $R_7$ is alkyl of 3–20 carbon atoms and $R_8$ is hydrogen or $R_7$;

m is 0 or 1; s is 5–25;

Z is —COO—, —SO$_3$—, —O—, -C$_1$-C$_4$-alkylene-COO—, -C$_1$-C$_4$-alkylene-SO$_3$, $$-C_1-C_4-\text{alkylene}-S-\overset{\overset{\displaystyle COOH}{|}}{CH}-CH_2COO-, \text{ or}$$

$$-C_1-C_4-\text{alkylene}-S-\overset{\overset{\displaystyle }{|}}{CH_2CHCH_2O}-;\\ \phantom{xxxxxxxxxxxxxxxxxxxxxx}OH$$

n is 0 or 1; and

Q is —CO or —SO$_2$—.

The fluorochemical surfactants used in accordance with the instant invention can be prepared according to known procedures. Thus, for example, the fluorochemical surfactants can be prepared by reacting known hydrocarbon surfactants of the formula $R_{HC}-Q_n-A-OH$ or $R_{HC}-Q_n-A-NHR_2$ with a fluoroaliphatic acid halide in an inert solvent.

For example, CF$_3$(CF$_2$)$_7$SO$_2$F, prepared according to U.S. Pat. No. 2,759,019 can be reacted with H(OCH$_2$CH$_2$)$_{5-20}$ N(stearyl)$_2$ such as Doxomeen 290 in diethyl ether as a solvent vehicle and pyridine or triethylamine as acid acceptor, to yield the corresponding ester of the formula CF$_3$(CF$_2$)$_7$SO$_2$(OCH$_2$CH$_2$)$_{20}$N(stearyl)$_2$.

Analogously, n-C$_3$F$_7$OCF(CF$_3$)CF$_2$OCF(CF$_3$)COF as taught in Canadian Pat. No. 725,740, can be reacted with octylphenoxypoly(ethylenoxy)ethanol having an average molecular weight between 514–778 in the presence of diethyl ether and pyridine as acid acceptor to yield the corresponding ester.

Alternatively, alpha-perfluoroalkene of the formula C$_n$F$_{2n-1}$ where n is 6–20 can be reacted with a hydrocarbon surfactant of the formula R$_{HC}$—Q$_n$—A—OH in the presence of potassium carbonate in an inert solvent, such as methyl ethyl ketone or acetone at a temperature of 20°–70° C., to yield the corresponding fluoroaliphatic ether.

For example, an oleic acid-ethylene oxide condensate (molecular weight of about 680) can be reacted with tetrafluoroethylene pentamer in the presence of potassium carbonate in acetone to yield a product of the formula C$_{10}$F$_{19}$O(CH$_2$CH$_2$O)$_{10}$COC$_{15}$H$_{29}$. If a mixture of cetyl/oleyl-ethylene oxide condensate is used (molecular weight of about 550), the corresponding cetyl-/oleyl ether product is obtained having the formula

C$_{10}$F$_{19}$O(CH$_2$CH$_2$O)$_{10}$C$_{16}$H$_{31/33}$.

Such compounds and their preparation as disclosed in Netherland Patent Specification No. 7,213,737.

Alternatively, fluoroaliphatic isocyanates and carbamic acid halides can be reacted with hydrocarbon surfactants of the formula R$_{HC}$—Q$_n$—A—OH or R$_{EHC}$—Q$_n$—A—NHR$_2$ to yield the corresponding urethanes and ureas, respectively. The reactions are advantageously carried out in the presence of an inert medium at temperatures of 20°–50° C. Where the fluoroaliphatic carbamic acid halide is a reactant, a tertiary amine, such as triethyl amine or pyridine, is advantageously added to promote the reaction and remove the hydrogen halide formed.

For example, 1,1-dihydroperfluorooctyl carbamyl chloride, prepared in accordance with Ger. No. 1,145,606, of the formula C$_7$F$_{15}$CH$_2$NHCOCl, is added slowly to ethoxylated (15 mole) coco fatty acid, such as Ethofat C/15, in diethyl ether, in the presence of triethyl amine as an HCl getter, while stirring. The resulting product has the formula

C$_7$F$_{15}$CH$_2$NHCOO(CH$_2$CH$_2$—O)$_{15}$COR$_{HC}$, where R$_{HC}$ is the coco fatty acid hydrocarbon residue.

Similarly, CF$_3$(CF$_2$)$_6$NCO, prepared in accordance with U.S. Pat. No. 2,617,817, can be reacted with a stearic or lauric acid amide-ethylenimine (4–6 mole) condensate, such as those described in U.S. Pat. No. 2,163,807 for example, in an inert diluent to form a product of the formula

CF$_3$(CF$_2$)$_6$NHCO(NHCH$_2$CH$_2$)$_{4-6}$NHCO—R$_{HC}$ wherein R$_{HC}$ is the hydrocarbon residue of stearic or lauric acid.

The product can be neutralized with aqueous HCl or H$_2$SO$_4$ to obtain the corresponding salts, or can be alkylated with dimethylsulfate or a methyl halide, such as methyl bromide to form the tertiary and quaternary ammonium derivatives thereof. Alternatively, the product can be reacted with ethylene oxide, e.g., in amounts of 4–15 moles per mole of product, to form the ethoxylated derivatives thereof, in the presence of an HCl catalyst.

Analogously, phosgene can be reactd with nonionic hydrocarbon surfactants of the formula R$_{HC}$—Q$_h$A—OH to form the corresponding chloroformate and the acid chloride reacted with a fluoroaliphatic alcohol or amine to form the corresponding carbonate or urethane, respectively. Advantageously, the reactions are conducted in the presence of a tertiary amine, such as triethylamine, and an inert diluent.

For example, C$_{12}$H$_{25}$S(CH$_2$CH$_2$O)$_{10}$H, such as Tergitol 12-M10, can be reacted with phosgene in the presence of triethyl amine to yield the corresponding acid chloride, C$_{12}$H$_{25}$S(CH$_2$CH$_2$O)$_{10}$COCl, which in turn, is reacted with a fluoroaliphatic alcohol such as (CF$_3$)$_2$CFO—CF$_2$CF$_2$—CH$_2$CH$_2$CONH(CH$_2$)$_3$OH, disclosed in U.S. Pat. No. 3,697,564, in the presence of triethylamine in diethyl ether to yield a product of the formula (CF$_3$)$_2$CFO—CF$_2$CF$_2$CH$_2$CH$_2$CONH(CH$_2$)$_3$OCO(OCH$_2$CH$_2$)$_{10}$S—C$_{12}$H$_{25}$.

Likewise, C$_{10}$F$_{19}$OC$_6$H$_4$SO$_2$Cl, as described in British Patent Specification Nos. 1,130,822 and 1,270,662 can be reacted with polyoxyethylene (20) sorbitan monolaurate in the presence of triethylamine in an inert diluent to obtain the corresponding ester.

Advantageously, the fluorochemical surfactants can be made by reacting a hydrocarbon surfactant of the formula $R_{HC}$—$Q_n$—A—OH with an equimolar amount of toluene diisocyanate to form the 1:1 urethane adduct thereof, and reacting the urethane monoisocyanate with a polyfluoro aliphatic amine or alcohol.

Thus, nonylphenoxypolyethoxyethanol having an average of 4 moles of ethylene oxide, such as IGEPAL CO-430, can be reacted with one mole of toluene diisocyanate to form the corresponding 1:1 adduct, which, in turn is reacted with a perfluoroalkylalkylamine of the formula $C_8F_{17}(CH_2)_5NH_2$, which can be prepared in accordance with U.S. Pat. No. 3,257,407, to form the corresponding urea derivative.

Analogously, many fluorochemical surfactants of the formula $R_f$—$Z_n$—A—OH can be reacted with suitable aliphatic or araliphatic acid halides, isocyanates, and the likes, to form suitable fluorochemical surfactants for use in accordance with the instant invention.

For example, $C_8F_{17}SO_2N(C_2H_5)$—$CH_2CH_2(OCH_2CH_2)_{10}$—OH, disclosed in U.S. Pat. No. 2,915,554, can be reacted with dodecylbenzenesulfonyl chloride in diethyl ether in the presence of triethylamine to yield the corresponding sulfonate ester.

Useful surfactants for use in accordance with the instant invention can also be prepared by reacting a fluoroaliphatic thiol with an ethylenically unsaturated dicarboxylic acid anhydride, and reacting the resulting anhydride condensate with an equimolar amount of hydrocarbon surfactant of the formula $R_{HC}$—$Q_n$—A—OH or $R_{HC}$—$Q_n$—A—$NH_2$, to obtain the resulting half ester or half amide, respectively. Alternatively, the ethylenically unsaturated dicarboxylic acid anhydride can be reacted with an equimolar amount of hydrocarbon surfactant of the formula $R_{HC}$—$Q_n$—A—OH or $R_{HC}$—Q—A—$NH_2$, for example, and the reaction product reacted with a fluoroaliphatic thiol.

For example, dodecylphenoxypolyethoxyethanol (containing 9 moles of ethylene oxide) such as Tergitol 12-P-9 can be reacted with an equimolar amount of maleic anhydride in an inert diluent, such as sulfolane, to yield the corresponding half ester of the formula:

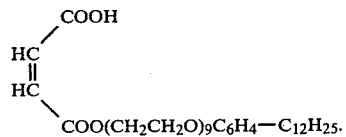

The half ester can then be reacted with a fluoroaliphatic thiol, such as $C_9F_{19}C_2H_4SH$, obtained according to U.S. Pat. Nos. 3,172,910, and 3,088,849. The reaction is advantageously carried out in substantially stoichiometric amounts in aqueous ethanol in the presence of small amounts of sodium hydroxide and a tertiary amine, such as piperidine, at from 20°-75° C., to form, for example, a product of the formula:

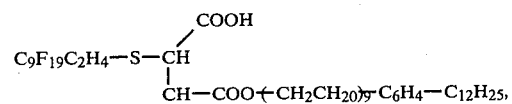

Analogously, 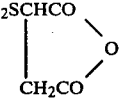

prepared in accordance with U.S. Pat. No. 3,471,518 can be reacted with

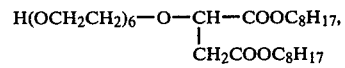

disclosed in U.S. Pat. No. 2,341,846, by refluxing equimolar amounts in dioxans to produce the corresponding half ester.

Likewise,

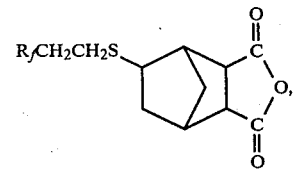

where $R_f$ is a mixture of $C_6$–$C_{10}$ perfluoroalkyl, prepared by reacting norbornene anhydride and $R_fCH_2CH_2SH$ in the presence of a small amount of an azobutyronitrile as catalyst, can be reacted with 3-(n-dodecylamino)propylamine in equimolar amounts at temperatures of 20°-50° C. in an inert diluent such as toluene and dehydrate the product by azeotropic distillation of water to yield the corresponding imine, which, in turn can be ethoxylated with 10 moles of ethylene oxide in an aqueous acidic medium to yield a product of the formula:

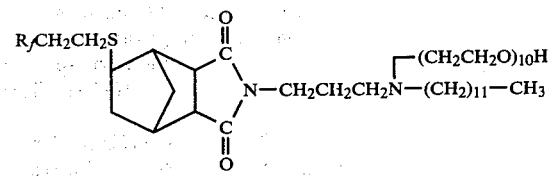

Some of the fluorochemical surfactants which can be used in accordance with the instant invention are known compounds, such as those described in copending U.S. application Ser. No. 858,218, filed Dec. 7, 1977, the disclosure of which is incorporated herein by reference, as well as Netherlands Specification No. 7,213,737.

Suitable fluorochemical surfactants as defined above and used in accordance with the instant invention can readily be prepared from known starting materials by conventional techniques, such as those illustrated above, and as further illustrated in the following examples.

Advantageously, the fluorochemical surfactants are used alone in an aqueous system or in combination with a conventional waterflooding surfactant. Such surfactants for enhanced oil recovery are well known and include anionic surfactants, such as petroleum sulfonates, synthetic alkyl aryl sulfonates and the like, anionic-nonionic surfactant systems, such as those disclosed in U.S. Pat. Nos. 3,811,504, 3,792,731 and 4,005,749 and cationic surfactant systems.

As the artisan can appreciate, mixtures of cationic and anionic surfactants are generally to be avoided as they may be incompatable due to interaction.

The total amount of surfactant based upon the aqueous medium may vary within wide limits, e.g., between 0.01 and 40 weight percent, ordinarily 0.05-20 weight percent. When using a mixture of fluorochemical surfactant according to the instant invention and a conventional waterflooding surfactant, ordinarily there is present at least 1%, preferably at least 4%, of the fluorochemical surfactant, based on the amount of non-fluorochemical surfactant.

The aqueous surfactant slug may also advantageously contain suitable co-surfactants such as aliphatic or alkyl aryl alcohols having a molecular weight of 40-220 in amounts of up to 10% by volume of the solution. A monovalent salt may also be present in the aqueous medium in amount up to 5% by weight based upon the aqueous medium for purposes of salinity control.

Various thickening agents, such as guar gum or polysaccharide, and sacrificial agents, such as inorganic polyphosphates or alkali metal carbonates, may also be present.

In one embodiment of the invention, the surfactant slug may be in the form of an aqueous petroleum oil emulsion containing 0.5-40% by weight of oil, based upon the weight of the aqueous phase.

In a further embodiment of the invention, the terminal portion of the aqueous surfactant slug, or aqueous petroleum oil emulsion, exhibits a lower concentration of non-aqueous ingredients than the initial portion injected into the reservoir from which the oil is recovered. The use of such a concentration gradient thus reduces the total amount of surfactant necessary in the oil recovery procedure.

The following examples are merely illustrative of the instant invention and are not intended to limit the scope thereof. All parts are by weight unless otherwise specified.

EXAMPLE 1

Into a 500 ml vessel fitted with a thermometer, stirrer and nitrogen inlet, there was placed 84.2 grams (0.075 moles) of polyethoxylated cetyl alcohol having an average of 20 ethoxy units and having the formula:

and stirred at 50°-55° C. under a nitrogen blanket. Boron trifluoride in the form of the diethyl ether complex (47.3% BF$_3$) was added in the amount of 0.4 grams. Then 6.1 grams of epichlorohydrin (0.066 moles) was slowly added to the mixture while maintaining the temperature at 50°-60° C. over a period of about 10 minutes. The reaction mixture was then stirred at a temperature of 50°-60° C. for an additional 30 minutes. The product formed has the formula:

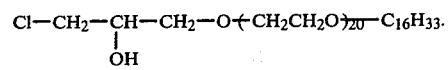

To this reaction product there was then added 140.3 grams of anhydrous isopropyl alcohol and 27.9 grams of R$_f$CH$_2$CH$_2$SH, where R$_f$ is straight chain perfluoroalkyl having the following R$_f$ distribution: 0.9% C$_4$F$_9$—, 32.9% C$_6$F$_{13}$—, 37.5% C$_8$F$_{17}$—, 22.99% C$_{10}$F$_{21}$— and 5.3% C$_{12}$F$_{25}$ (average M.W. approx. 465), and the mixture stirred at about 50° C. Then 5.4 grams of 50% aqueous NaOH (0.0672 moles) were slowly added at a rate which maintained the reaction mixture at 50°-60° C. A white precipitate of NaCl formed. The mixture was stirred for an additional hour at 50°-55° C. and turned from colorless to pale yellow. The solution was then filtered to remove byproduct NaCl. Upon drying, 73.6 grams of product (about 70% yield) was obtained. The product has the formula:

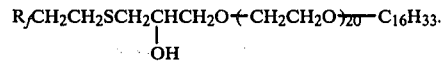

EXAMPLE 2

Using the procedure of Example 1, polyethoxylated stearyl amine of the formula

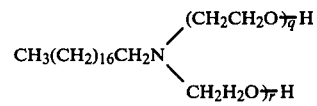

(where q + r is 15)

such as Ethomeen 18/25, in the amount of 54.69 grams (0.063 moles) was reacted with 5.09 grams (0.055 moles) of epichlorohydrin in the presence of 0.3 grams of BF$_3$.diethyl ether complex, and the resulting reaction product reacted with 23.25 grams of the R$_f$CH$_2$CH$_2$SH of Example 1 in the presence of 4.48 grams of 50% aqueous NaOH in 98.85 grams of isopropanol. The reaction product was stirred for two hours before filtering to yield 151.47 grams amber colored hazy solution solution. Upon refiltering, 142.01 grams of clear amber solution was obtained. Upon drying, 46.43 grams of the product of the formula

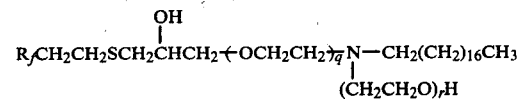

were obtained.

EXAMPLE 3

Using the procedure of Example 1, 264.0 grams of ethoxylated (15) p-nonylphenol having the formula

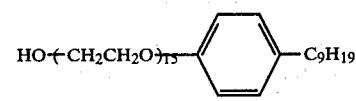

were reacted with 24.42 grams of epichlorohydrin in the presence of 1.6 grams of BF$_3$.diethylether complex and the product thereof was subsequently reacted with 111.6 grams of R$_f$CH$_2$CH$_2$SH, wherein R$_f$ has the distribution as in Example 1, in the presence of 21.50 grams of 50% aqueous sodium hydroxide and 460.4 grams of isopropyl alcohol. The resulting reaction product has the formula

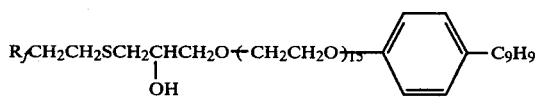

EXAMPLE 4

Maleic anhydride, 2.55 grams and sulfolane, 2.55 grams, as solvent, were added to 36.45 grams of dinonyl polyethoxylated (24) phenol of the formula

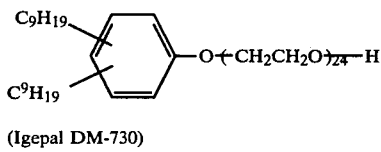

(Igepal DM-730)

and stirred for 20 hours at 60° C., to form a reaction mixture containing a half ester of the formula

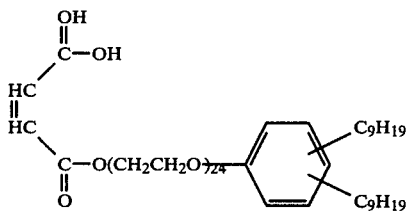

To this reaction mixture there was then added 0.1 grams of triethylamine and 11.63 grams of $R_fCH_2CH_2SH$ having the $R_f$ distribution as in Example 1 under a nitrogen blanket and the mixture stirred at 60° C. for about 7 hours. The product has the formula

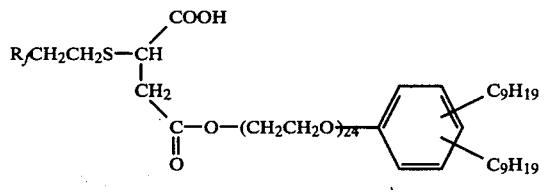

EXAMPLE 5

In order to measure the effectiveness of fluorochemical surfactant in dislodging oil from an oil bearing subterranean formation by increasing the effectiveness of the aqueous medium, the following screening technique was used:

Procedure: 20 g of a sand-oil mixture (10% A.S.T.M. oil No. 3 and 90% Ottawa standard sand 20–30 mesh) are placed in a 25×150 mm test tube. The test solution (25 ml at 0.1% actives of sample in deionized water) is carefully laid over the sand-oil mixture. The system is then allowed to stand, undisturbed, for 18–20 hours. Any oil that percolates to the surface is drawn off with a pipette and weighed. Results are reported as percent recovered (i.e., the weight of oil recovered compared to the theoretical maximum of 2.0 g oil in the tube). 3 to 5 runs are done for each sample for an average value.

In the following Tables, the compounds were screened at 0.10% actives in deionized water; surface tensions and interfacial tensions were measured in dionized at 0.1% actives; and interfacial tensions were measured against cyclohexane. Except where otherwise indicated, the $R_f$ distribution in the perfluoroalkyl surfactants were: 0.9% $C_4F_9$—, 32.9% $C_6F_{13}$—, 37.5% $C_8F_{17}$—, 22.9% $C_{10}F_{21}$—, and 5.3% $C_{12}F_{25}$—.

TABLE 1

$R_fCH_2CH_2SCH_2CHCH_2O(CH_2CH_2O)_s R_{HC}$, OH

| No. | Approx. Value of s | $R_{HC}$ | Percent Oil Recovered | Surface Tension (dynes/cm) | Interfacial Tension (dynes/cm) |
|---|---|---|---|---|---|
| 1 | 15 | —⟨⟩—$C_9H_{19}$ | 61.4 | 24.09 | 6.2 |
| 2 | 20 | —$C_{16}H_{33}$ | 52.0 | 22.6 | 6.5 |
| 3 | 20 | —$C_{18}H^{37}$ | 46.8 | 20.7 | 7.0 |
| 4 | 15 | —$C_{13}H_{27}$ | 36.7 | 19.9 | 6.0 |
| 5 | | $(OCH_2CH_2)_q$—N—$(CH_2CH_2O)_rH$, R; q + r ≅ 15, r = stearyl | 69.8 | 25.6 | 7.3 |
| 6 | 24 | ⟨⟩ $C_9H_{19}$, $C_9H_{19}$ | 40.2 | 22.3 | 5.4 |
| 7 | 5 | —⟨⟩—$C_9H_{19}$ | 10.2 | 20.7 | 18.6 |
| 8 | 11 | —⟨⟩—$C_9H_{19}$ | 46.0 | 23.4 | 10.7 |
| 9 | 20 | —⟨⟩—$C_9H_{19}$ | 35.4 | 20.7 | 5.0 |
| 10 | 30 | —⟨⟩—$C_9H_{19}$ | 27.0 | 24.9 | 5.5 |

TABLE 2

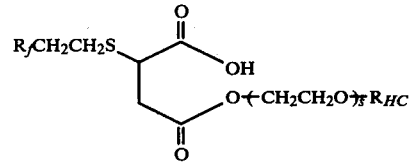

prepared in accordance with procedures set forth in Example 4.

| No. | Approx. Value of s | $R_{HC}$ | Percent Oil Recovered | Surface Tension (dynes/cm) | Interfacial Tension (dynes/cm) |
|---|---|---|---|---|---|
| 11 | 24 | ⟨⟩ $C_9H_{19}$, $C_9H_{19}$ | 44.7 | 29.2 | 6.6 |
| 12 | 20 | —$C_{18}H_{37}$ | 68.1 | 27.1 | 5.1 |
| 13 | 15 | —⟨⟩—$C_9H_{19}$ | 86.9 | 24.2 | 7.1 |
| 14* | 20 | —⟨⟩—$C_9H_{19}$ | 59.9 | 26.3 | 5.3 |

TABLE 2-continued

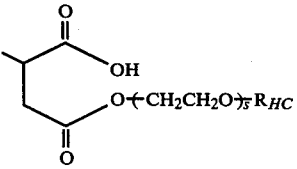

prepared in accordance with procedures set forth in Example 4.

| No. | Approx. Value of s | $R_{HC}$ | Percent Oil Recovered | Surface Tension (dynes/cm) | Interfacial Tension (dynes/cm) |
|---|---|---|---|---|---|
| 15 | 5 | —⟨phenyl⟩—C$_9$H$_{19}$ | 36.6 | 24.5 | 7.5 |
| 16 | | $+OCH_2CH_2)_q$—N$+CH_2CH_2O)_r$H<br>q + r = 15, r = stearyl | | | |

*$R_f$ = 25% C$_6$F$_{13}$—, 50% C$_8$F$_{17}$—, 25% C$_{10}$F$_{21}$—

EXAMPLE 6

For purposes of comparison, a conventional petroleum sulfonate used in tertiary oil recovery, Petronate L, was screened according to the technique specified in the procedure set forth in Example 5, supra. An average of 8.1% oil was recovered.

EXAMPLE 7

In the following table, formulations of various hydrocarbon surfactants with representative fluorochemical surfactants and their effectiveness in dislodging oil according to the procedure set forth in Example 5 are given. In the following table, hydrocarbon surfactant A is a commercial anionic sulfate surfactant (Conco EL-30); hydrocarbon surfactant B is a polyethoxylated nonylphenol nonionic surfactant (Igepal CO-710); and surfactant C is petroleum sulfonate anionic surfactant (Petronate L).

TABLE 3

| No. | Actives in solution | % oil recovered |
|---|---|---|
| A | 0.09% | 19.5 |
| B | 0.09% | 51.7 |
| C | 0.10% | 8.1 |
| 5 | 0.01% | 13.5 |
| 1 | 0.01% | 45.6 |
| 13 | 0.01% | 31.2 |
| { 5<br>  A | 0.01%<br>0.09% | 34.9 |
| { 5<br>  B | 0.01%<br>0.09% | 57.5 |
| { 5<br>  C | 0.01%<br>0.09% | 13.2 |
| { 1 | 0.01% | 28.3 |

TABLE 3-continued

| No. | Actives in solution | % oil recovered |
|---|---|---|
| A | 0.09% | |
| { 1 | 0.01% | 37.5 |
| { B | 0.09% | |
| { 1 | 0.01% | 12.2 |
| { C | 0.09% | |
| { 13 | 0.01% | 29.2 |
| { A | 0.09% | |
| { 13 | 0.01% | 67.0 |
| { B | 0.09% | |
| { 13 | 0.01% | 14.4 |
| { C | 0.09% | |
| { 13 | 0.05% | 77.9 |
| { B | 0.05% | |

The results of the above table indicate the advantages which may be obtained using formulations of conventional hydrocarbon surfactants coupled with the fluorochemical surfactants in tertiary oil recovery.

What is claimed is:

1. A compound of the formula $$R_fCH_2CH_2\text{—}S\text{—}CH_2\text{—}CH\text{—}CH_2\text{—}O+CH_2\text{—}CH_2O)_sR_{HC}$$
$$|$$
$$OH$$

wherein
$R_f$ is straight or branched chain perfluoroalkyl of 4 to 20 carbon atoms;
s is 5–30; and
$R_{HC}$ is alkyl of 6–24 carbon atoms or a group of the formula

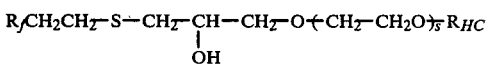

where
$n_4$ is 0 or 1,
$R_7$ is alkyl of 3–20 carbon atoms; and
$R_8$ is hydrogen, halo, nitro or $R_7$.

2. A compound according to claim 1, wherein $R_f$ is perfluoroalkyl of 6–20 carbon atoms; $R_{HC}$ is alkyl of 6–24 carbon atoms or a group of the formula

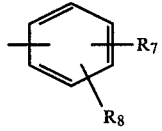

where $R_7$ is 6–12 carbon atoms and $R_8$ is hydrogen or $R_7$.

* * * * *